US008909991B2

(12) United States Patent
Xiang

(10) Patent No.: US 8,909,991 B2
(45) Date of Patent: Dec. 9, 2014

(54) FAULT TREE SYSTEM RELIABILITY ANALYSIS SYSTEM, FAULT TREE SYSTEM RELIABILITY ANALYSIS METHOD, AND PROGRAM THEREFOR

(75) Inventor: Jianwen Xiang, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/000,818

(22) PCT Filed: Feb. 21, 2012

(86) PCT No.: PCT/JP2012/054108
§ 371 (c)(1),
(2), (4) Date: Aug. 21, 2013

(87) PCT Pub. No.: WO2012/115095
PCT Pub. Date: Aug. 30, 2012

(65) Prior Publication Data
US 2013/0332776 A1 Dec. 12, 2013

(30) Foreign Application Priority Data

Feb. 22, 2011 (JP) ................. 2011-035436

(51) Int. Cl.
G06F 11/00 (2006.01)
G06F 11/26 (2006.01)
G05B 23/02 (2006.01)
G06F 17/50 (2006.01)

(52) U.S. Cl.
CPC .......... *G06F 11/26* (2013.01); *G05B 23/0248* (2013.01); *G06F 17/504* (2013.01); *G06F 2217/70* (2013.01)
USPC ........................................ 714/37

(58) Field of Classification Search
USPC .................................... 714/26, 37
See application file for complete search history.

(56) References Cited

U.S. PATENT DOCUMENTS 6,480,814 B1 * 11/2002 Levitan ............................ 703/2

FOREIGN PATENT DOCUMENTS

| JP | 3445517 B2 | 9/2003 |
|---|---|---|
| JP | 2010-181212 A | 8/2010 |
| JP | 2010-237855 A | 10/2010 |
| JP | 2012-108699 A | 6/2012 |
| JP | 2012-113582 A | 6/2012 |
| WO | 2011-132730 A1 | 10/2011 |
| WO | 2011-148891 A1 | 12/2011 |
| WO | 2012-115007 A1 | 8/2012 |

OTHER PUBLICATIONS

NASA, "Fault Tree Handbook with Aerospace Applications" version 1.1, pp. 1 and 157, Aug. 2002.*
Yahoo Answers: science and math published conversation, retrieved on May 16, 2014 from https://answers.yahoo.com/question/index;_ylt=A0LEVxflPXZTG3gALg5XNyoA;_ylu=X3oDMTEzam1xc-XQwBHNIYwNzcgRwb3MDMwRjb2xvA2JmMQR2dGlkA1ZJ-UDM2NV8x?qid=20101004073607AATH9nV, published more than 4 years ago.*
Office Action issued by the Japanese Patent Office dated Sep. 18, 2013 in counterpart Application No. 2013-501066.

(Continued)

*Primary Examiner* — Yair Leibovich
(74) *Attorney, Agent, or Firm* — Sughrue Mion, PLLC

(57) ABSTRACT

The present invention is a fault tree system reliability analysis system, comprising: k/n gate splitting means for splitting a disjunctive k/n gate with inputs of OR gates into disjoint conjunctive k/m gates (m≤n) without input of OR gate.

14 Claims, 3 Drawing Sheets

Splitting Lemma Given a k/n gate, $G = \frac{k}{n}(A)$
where $A = \{e_{11} + e_{12}, \cdots, e_{n1} + e_{n2}\}$ (assume $e_{ij}$ are events).

$k \geq (n+1)/2k$ and $2^k - 1 = \binom{n}{k-1}$ let $B = \{e_{11}, \cdots, e_{n1}\}$ and $C = A \setminus B = \{e_{12}, \cdots, e_{n2}\}$.
then 1. $G = splitting(G) = \frac{k}{n}(B) + \sum_{b \in \frac{k}{n}(B)} \frac{k}{m}((b) \oplus C)$, where
$\{e_{11}, \cdots e_{(k-1)1}\} \oplus \{e_{12}, \cdots, e_{(k-1)2}, e_{k2}, \cdots, e_{n2}\} = \{e_{11}, \cdots, e_{(k-1)1}, e_{k2}, \cdots, e_{n2}\}$,
$m = |(b) \oplus C|$ 2. $|\{splitting(G)\}| = 2^k$

(56) References Cited

OTHER PUBLICATIONS

Antoine Rauzy, "Toward an Efficient Implementation of the MOCUS Algorithm", IEEE Trans. on Reliability, 2003, pp. 175-180, vol. 52, No. 2.

Masafumi Nakamura, "Standardization for FTA (fault tree analysis) Technique", [online], Jun. 1, 2010, The Journal of reliability Engineering Association of Japan, pp. 244-251, vol. 32, No. 4, [retrieval date May 15, 2012], Internet <http://ci.nii.ac.jp/els/110007658298.pdf?id=ART0009474449&type=pdf&lang=jp&host=cinii&_order_no=&ppv_type=0〈_sw=&no=1337073293&cp=>.

Minoru Mukuda, "Study on Optimal Design for System Reliability by Multiobjective Genetic Algorithms", [online], Jun. 2005, pp. 12-19, [retrieval date May 15, 2012], Internet <http://dspace.wul.waseda.ac.jp/_dspace/bitstream/2065/5445/1/Honbun-4059.pdf>.

Kevin S. Brown, "Evaluating Fault Trees (AND & OR Gates Only) with Repeated Events", [online], Jun. 1990, IEEE Transactions on Reliability, pp. 226-235, vol. 39, No. 2, [retrieval date May 15, 2012], Internet <http://ieeexplore.ieee.org/stamp/stamp.jsp?arnumber=00055886>.

Jong Soo Choi, et al., "Truncation Error Evaluation Method for Minimal Cut Set-Based Fault Tree Analysis", [online], Taylor & Francis, Oct. 2005, Journal of Nuclear Science and Technology, pp. 854-860, vol. 42, No. 10, [retrieval date May 15, 2012], Internet <http://www.tandfonline.com/doi/pdf/10.1080/18811248.2005.9711036>.

International Search Report for PCT/JP2012/054108, dated May 29, 2012.

* cited by examiner

FIG. 3

Splitting Lemma Given a k/n gate, $G = \%_n(A)$
where $A = \{e_{11} + e_{12}, \cdots, e_{n1} + e_{n2}\}$, (assume $e_{ij}$ are events).
$k \geq (n+1)/2k$ and $2^k - 1 = \binom{n}{k-1}$
let $B = \{e_{11}, \cdots, e_{n1}\}$ and $C = A \setminus B = \{e_{12}, \cdots, e_{n2}\}$,
then 1. $G = splitting(G) = \%_n(B) + \sum_{b \in (B^{-1}\%_n(B))} \%_m(\{b\} \oplus C)$, where
   $\{e_{11}, \cdots e_{(k-1)1}\} \oplus \{e_{12}, \cdots, e_{(k-1)2}, e_{k2}, \cdots, e_{n2}\} = \{e_{11}, \cdots, e_{(k-1)1}, e_{k2}, \cdots, e_{n2}\}$,
   $m = |\{b\} \oplus C|$ 2. $|(splitting(G))| = 2^k$

FIG. 4

$\%_3(\{a_1 + a_2, b_1 + b_2, c_1 + c_2\}) =$ $\%_3(\{a_1, b_1, c_1\}) +$
$\%_m(\{a_1\} \oplus \{a_2, b_2, c_2\}) +$
$\%_m(\{b_1\} \oplus \{a_2, b_2, c_2\}) +$
$\%_m(\{c_1\} \oplus \{a_2, b_2, c_2\}) =$ $\%_3(\{a_1, b_1, c_1\}) +$
$\%_3(\{a_1, b_2, c_2\}) +$
$\%_3(\{a_2, b_1, c_2\}) +$
$\%_3(\{a_2, b_2, c_1\})$

FIG. 5

$$\frac{2}{3}(\{a_1+a_2, b_1+b_2, c\}) =$$

$$\frac{2}{3}(\{a_1, b_1, c\}) +$$
$$\frac{2}{m}(\{a_1\} \oplus \{a_2, b_2\}) +$$
$$\frac{2}{m}(\{b_1\} \oplus \{a_2, b_2\}) +$$
$$\frac{2}{m}(\{c\} \oplus \{a_2, b_2\}) =$$

$$\frac{2}{3}(\{a_1, b_1, c\}) +$$
$$\frac{2}{2}(\{a_1, b_2\}) +$$
$$\frac{2}{2}(\{b_1, a_2\}) +$$
$$\frac{2}{3}(\{c, a_2, b_2\}) =$$

$$\frac{2}{3}(\{a_1, b_1, c\}) +$$
$$\frac{2}{3}(\{a_2, b_2, c\}) +$$
$$\{a_1, b_2\} +$$
$$\{a_2, b_1\}$$

FAULT TREE SYSTEM RELIABILITY ANALYSIS SYSTEM, FAULT TREE SYSTEM RELIABILITY ANALYSIS METHOD, AND PROGRAM THEREFOR

CROSS REFERENCE TO RELATED APPLICATIONS

This application is a National Stage of International Application No. PCT/JP2012/054108 filed Feb. 21, 2012, claiming priority based on Japanese Patent Application No. 2011-035436 filed Feb. 22, 2011, the contents of all of which are incorporated herein by reference in their entirety.

TECHNICAL FIELD

The present invention relates to a fault tree system reliability analysis system, a fault tree system reliability analysis method, and a program therefor, and particularly to reliability analysis on a fault tree including voting gates (k/n, k-out-of-n gates).

BACKGROUND ART

In fault tree analysis (FTA), a k/n gate is usually converted into a set of k-combinations of its input events for evaluating minimal cut sets (MCSs) in a fault tree. As proposed by NPL 1, the conversion is generally executed by repetitively expanding the k/n gate into sub-voting gates until k=1 or k=n is attained.

However, the space complexity by the expansion (that is, the number of resulting k-combinations) is $$O\left(\frac{n!}{k(n-k)!}\right),$$

and in such a case, the problem becomes factorial, which easily results in a memory overflow error in practice when n is relatively large and k is close to n/2.

Further, the problem of the space complexity becomes more serious when an input to a k/n gate is not a basic event but, for example, a disjunction (OR gate) of other events. For example, for a k/n gate in which each input is comprised of a disjunction of l events, the space complexity is $$O\left(l^k \cdot \frac{n!}{k(n-k)!}\right).$$

CITATION LIST

Non Patent Literature

NPL 1: A. Rauzy, "Toward an Efficient Implementation of the MOCUS Algorithm", IEEE Trans. on Reliability, Vol. 52, 2003, pp. 175-180.

SUMMARY OF INVENTION

Technical Problem

As described above, expansion of a k/n gate is a problem of the space complexity. This is especially true when an input to a k/n gate is an OR gate, instead of a basic event. The reason thereof is that as k and n increase and the number of OR gate inputs to the k/n gate increases, the total number of combinations of the k/n gate dramatically increases.

Moreover, readability of resulting MCSs is poor. The reason thereof is that an enormous number of MCSs are generated by expanding a k/n gate.

The present invention has been thus made in view of such problems, and its object is to provide a fault tree system reliability analysis system, a fault tree system reliability analysis method, and a program therefor for splitting a disjunctive k/n gate with inputs of OR gates into a set of disjoint conjunctive k/m gates (m≤n) without input of OR gate.

Solution to Problem

The present invention is a fault tree system reliability analysis system, comprising: k/n gate splitting means for splitting a disjunctive k/n gate with inputs of OR gates into disjoint conjunctive k/m gates (m≤n) without input of OR gate.

The present invention is a fault tree system reliability analysis method, comprising: splitting a disjunctive k/n gate with inputs of OR gates into disjoint conjunctive k/m gates (m≤n) without input of OR gate.

The present invention is a program for a fault tree system reliability analysis method, causing an information processing apparatus to execute: k/n gate splitting processing of splitting a disjunctive k/n gate with inputs of OR gates into disjoint conjunctive k/m gates (m≤n) without input of OR gate.

Advantageous Effects of Invention

The present invention can reduce the space complexity required in evaluating a disjunctive k/n gate in an expansion method, and improve readability of resulting MCSs in fault tree analysis.

BRIEF DESCRIPTION OF DRAWINGS

FIG. 3 is a diagram showing an exemplary lemma of splitting of a disjunctive k/n gate.
FIG. 4 is a diagram showing an example of a disjunctive 2/3 gate and a result of splitting thereof.
FIG. 5 is a diagram showing another example of a disjunctive 2/3 gate and a result of splitting thereof.

DESCRIPTION OF EMBODIMENTS

The present invention comprises k/n gate splitting means for splitting a disjunctive k/n gate with inputs of OR gates, wherein k≥(n+1)/2, and $$2^k = 1 + \binom{n}{k-1}$$

into a set of disjoint conjunctive k/m gates (m≤n) without input of OR gate. Then, when the k/m gate resulting from the splitting is a minimal voting gate, no additional expansion is needed.

As used herein, disjoint k/n gates refer to two or more k/n gates including no repeated or redundant k-combination.

Moreover, a minimal k/n gate refers to a k/n gate whose inputs are all basic events and which includes no repeated or redundant k-combination with other cut sets in the fault tree.

By such a configuration, there is no need to expand an original input k/n gate nor expand a resulting k/m gate when it is minimal. Hence, the space for evaluating MCSs in a fault tree can be efficiently saved, and further, readability of MCSs can be improved.

Next, an embodiment of the present invention will be described in detail with reference to the accompanying drawings.

Figure 1:
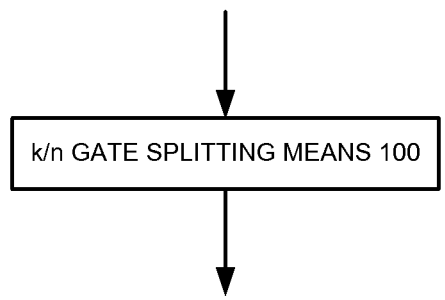
FIG. 1 is a block diagram showing a configuration of an embodiment of the present invention.

Referring to FIG. 1, the embodiment of the present invention comprises k/n gate splitting means 100. The means operates as generally described below:

The k/n gate splitting means 100 splits a disjunctive k/n gate with inputs of OR gates into a set of disjoint conjunctive k/m gates (m≤n) without input of OR gate.

Figure 2:
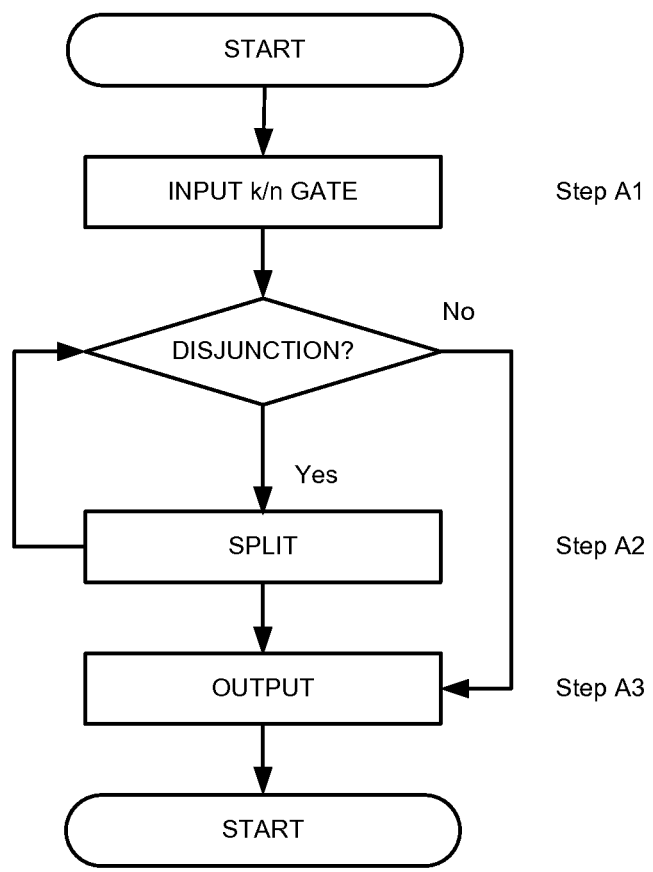
FIG. 2 is a flow chart of the present embodiment.

Next, a general operation of the present embodiment will be described in detail with reference to FIG. 1 and the flow chart in FIG. 2.

First, when a k/n gate is given (Step A1), a check is made whether its input is an OR gate, and satisfies a splitting lemma shown in FIG. 3. In a case that the input to the k/n gate is an OR gate, and is a disjunctive k/n gate that satisfies the splitting lemma shown in FIG. 3, it is split into a set of disjoint k/m gates (m≤n) by the k/n gate splitting means 100 based on the splitting lemma shown in FIG. 3 (Step A2). For each of the resulting k/m gates, the aforementioned steps are repeated until all conditional gates have become a conjunction, that is, until no more input OR gate is found. Finally, the split conditional conjunctive gates are output (Step A3).

Next, an effect of the present embodiment will be described.

The present embodiment repetitively splits a disjunctive k/n gate into a set of disjoint k/m gates (m≤n). Hence, even when a disjunctive k/n gate is given, it can be ultimately split into a set of disjoint conjunctive voting gates without expansion.

Example 1

Next, an operation of the present invention will be described using specific examples.

As shown in FIGS. 4 and 5, the method of the present invention will be proved using two cases. For clarification, it is assumed that fault trees in the two cases are each comprised of only one disjunctive 2/3 gate with inputs of OR gates.

A difference between the two cases is that: all the three inputs to the 2/3 gate in the first case (FIG. 4) are each comprised of an OR gate with inputs of two basic events (e.g., $a_1+a_2$). On the other hand, for the 2/3 gate in the second case (FIG. 5), only two inputs are each comprised of an OR gate with inputs of two basic events, and the remaining one is a basic event (c).

Referring to FIG. 4, the disjunctive 2/3 gate is split by the k/n gate splitting means 100 (Step A2). The splitting is achieved by applying the splitting lemma shown in FIG. 3. For example, given $A=\{a_1+a_2, b_1+b_2, c_1+c_2\}$, then, $B=\{a_1, b_1, c_1\}$ and $C=\{a_2, b_2, c_2\}$ can be derived, and three 2/3 gates whose inputs are basic events only can be derived by applying a special set union operation:

$\oplus$ to each (K−1) combination of B and C. These 2/3 gates constitute output conjunctive voting gates along with a B-based 2/3 gate, that is, 2/3 $\{a_1, b_1, c_1\}$.

In this case, since all of inputs to the four resulting 2/3 gates are basic events and the four 2/3 gates are disjoint, the four 2/3 gates are minimal. These gates can be directly output in a compact form of four MCSs.

On the other hand, application of a conventional expansion method causes a number:

$$2^k \binom{2}{3} = 12$$

of MCSs (2-combination) to be generated.

According to the present invention, only a number $$1 + \binom{2-1}{3} = 4$$

of minimal 2/3 gates are generated, and the spatial gain is approximately $2^k$ times as compared with the conventional expansion method.

A process in the second case is similar to the first one. In the present case, it should be noted that the value of C is different because inputs to an input disjunctive k/n gate include a basic event. It is natural that a result from application of a special set union operation:

$\oplus$ is different, and two 2/2 voting gates and one 2/3 voting gate are derived. A final result is two 2/3 voting gates and two MCSs having a number of orders of two (that is, 2/2 gate), as shown in FIG. 5. For the present case, application of the conventional expansion method causes eight MCSs to be generated.

While several components may be configured in hardware, they also may be implemented by a computer program, as is obvious from the preceding description. In this case, a processor that is operated by programs stored in a program memory implements functions and/or operations similar to those in the aforementioned embodiment. It is also possible to implement part of functions of the aforementioned embodiment by a computer program.

Further, the content of the above-mentioned exemplary embodiments can be expressed as follows.

(Supplementary note 1) A fault tree system reliability analysis system, comprising:

k/n gate splitting means for splitting a disjunctive k/n gate with inputs of OR gates into disjoint conjunctive k/m gates (m≤n) without input of OR gate.

(Supplementary note 2) The fault tree system reliability analysis system according to Supplementary note 1, wherein:

said k/n gate splitting means repetitively performs splitting until all voting gates have become a conjunction for the k/m gates resulting from the splitting.

(Supplementary note 3) The fault tree system reliability analysis system according to Supplementary note 1 or 2, wherein:

disjoint k/n gates refer to two or more k/n gates including no repeated or redundant k-combination; and a minimal k/n gate refers to a k/n gate whose inputs are all basic events and which includes no repeated or redundant k-combination with other cut sets in a fault tree.

(Supplementary note 4) A reliability analysis method of a fault tree system, comprising:

splitting a disjunctive k/n gate with inputs of OR gates into disjoint conjunctive k/m gates (m≤n) without input of OR gate.

(Supplementary note 5) The reliability analysis method of a fault tree system according to Supplementary note 4, comprising:

repetitively performing splitting until all voting gates have become a conjunction for the k/m gates resulting from the splitting.

(Supplementary note 6) The reliability analysis method of a fault tree system according to Supplementary note 4 or 5, wherein:

disjoint k/n gates refer to two or more k/n gates including no repeated or redundant k-combination; and a minimal k/n gate refers to a k/n gate whose inputs are all basic events and which includes no repeated or redundant k-combination with other cut sets in a fault tree.

(Supplementary note 7) A program for a reliability analysis method of a fault tree system, causing an information processing apparatus to execute:

k/n gate splitting processing of splitting a disjunctive k/n gate with inputs of OR gates into disjoint conjunctive k/m gates (m≤n) without input of OR gate.

(Supplementary note 8) The program according to Supplementary note 7, causing the information processing apparatus to execute:

said k/n gate splitting processing that repetitively performs splitting until all voting gates have become a conjunction for the k/m gates resulting from the splitting.

(Supplementary note 9) The program according to Supplementary note 7 or 8, wherein:

disjoint k/n gates refer to two or more k/n gates including no repeated or redundant k-combination, and a minimal k/n gate refers to a k/n gate whose inputs are all basic events and which includes no repeated or redundant k-combination with other cut sets in a fault tree.

Above, although the present invention has been particularly described with reference to the preferred embodiments and examples, it should be readily apparent to those of ordinary skill in the art that the present invention is not always limited to the above-mentioned embodiments and examples, and changes and modifications in the form and details may be made without departing from the spirit and scope of the invention.

This application is based upon and claims the benefit of priority from Japanese patent application No. 2011-035436, filed on Feb. 22, 2011, the disclosure of which is incorporated herein in its entirety by reference.

INDUSTRIAL APPLICABILITY

The present invention can be used in evaluating MCSs in a fault tree including a disjunctive k/n gate.

REFERENCE SIGNS LIST 100 k/n gate splitting means

The invention claimed is:

1. A fault tree gate-splitting system of a reliability analysis system, the fault tree gate-splitting system comprising:
computer hardware configured to implement:
an input unit configured to input a disjunctive k/n voting gate with inputs of OR gates, n having a size that is splittable by the fault tree gate-splitting system; and
a k/n voting gate splitting unit configured to split said disjunctive k/n voting gate with inputs of OR gates into a disjunction of k/m voting gates (m≤n and m≥k) without inputs of said OR gates.

2. The fault tree gate-splitting system of a reliability analysis system according to claim 1,
wherein said k/n voting gate splitting unit is further configured to repetitively perform splitting until all voting gates have become conjunctive voting gates without inputs of any OR gates for said k/m voting gates resulting from the splitting.

3. The fault tree gate-splitting system of a reliability analysis system according to claim 1,
wherein said k/m voting gates resulting from the splitting are disjoint and include no repeated or redundant k-combinations provided that no more than (k−1) inputs are shared by any two of the k/m voting gates.

4. The fault tree gate-splitting system of a reliability analysis system according to claim 1, wherein k<n.

5. The fault tree gate-splitting system of a reliability analysis system according to claim 2, wherein k<n.

6. The fault tree gate-splitting system of a reliability analysis system according to claim 2,
wherein said conjunctive voting gates are disjoint and include no repeated or redundant k-combinations provided that no more than (k−1) inputs are shared by any two of the conjunctive voting gates.

7. A reliability analysis method of a fault tree gate-splitting system, comprising:
inputting a disjunctive kin voting gate with inputs of OR gates, n having a size that is splittable by the fault tree gate-splitting system, and
splitting said disjunctive kin voting gate with inputs of OR gates into a disjunction of k/m voting gates (m≤n and m≥k) without inputs of said OR gates.

8. The reliability analysis method of a fault tree gate-splitting system according to claim 7, further comprising:
repetitively performing the splitting until all voting gates have become conjunctive voting gates without inputs of any OR gate for the k/m voting gates resulting from the splitting.

9. The reliability analysis method of a fault tree gate-splitting system according to claim 7,
wherein said k/m voting gates resulting from the splitting are disjoint and include no repeated or redundant k-combinations provided that no more than (k−1) inputs are shared by any two of the k/m voting gates.

10. The reliability analysis method of a fault tree gate-splitting system according to claim 8, wherein
said conjunctive voting gates are disjoint and include no repeated or redundant k-combinations provided that no more than (k−1) are shared by any two of the conjunctive voting gates.

11. A non-transitory computer readable storage medium storing a program for a reliability analysis method of a fault tree gate-splitting system, causing an information processing apparatus to execute:
kin voting gate inputting processing of receiving a disjunctive kin voting gate with inputs of OR gates, n having a size that is splittable by the fault tree gate-splitting system; and
k/n voting gate splitting processing of splitting the disjunctive kin voting gate with inputs of OR gates into a disjunction of k/m voting gates (m≤n and m≥k) without inputs of said OR gates.

12. The non-transitory computer readable storage medium storing a program according to claim 11, causing the information processing apparatus to execute:

said k/n voting gate splitting processing that repetitively performs splitting until all voting gates have become conjunctive voting gates without inputs of any OR gate for the k/m voting gates resulting from the splitting.

13. The non-transitory computer readable storage medium storing a program according to claim 11,
wherein said k/m voting gates resulting from the splitting are disjoint and include no repeated or redundant k-combinations provided that no more than (k−1) inputs are shared by any two of the k/m voting gates.

14. The non-transitory computer readable storage medium storing a program according to claim 12,
wherein said conjunctive voting gates are disjoint and include no repeated or redundant k-combinations provided that no more than (k−1) are shared by any two of the conjunctive voting gates.

\* \* \* \* \*

UNITED STATES PATENT AND TRADEMARK OFFICE
CERTIFICATE OF CORRECTION

PATENT NO.         : 8,909,991 B2
APPLICATION NO.    : 14/000818
DATED              : December 9, 2014
INVENTOR(S)        : Jianwen Xiang It is certified that error appears in the above-identified patent and that said Letters Patent is hereby corrected as shown below:

In the Claims

Column 6, Line 29: In Claim 7, delete "kin" and insert -- k/n --

Column 6, Line 32: In Claim 7, delete "kin" and insert -- k/n --

Column 6, Line 57: In Claim 11, delete "kin" and insert -- k/n --

Column 6, Line 58: In Claim 11, delete "kin" and insert -- k/n --

Column 6, Line 62: In Claim 11, delete "kin" and insert -- k/n --

Signed and Sealed this
Twenty-second Day of September, 2015

Michelle K. Lee
*Director of the United States Patent and Trademark Office*